United States Patent [19]
Brkovic et al.

[11] Patent Number: 5,654,880
[45] Date of Patent: Aug. 5, 1997

[54] SINGLE-STAGE AC-TO-DC FULL-BRIDGE CONVERTER WITH MAGNETIC AMPLIFIERS FOR INPUT CURRENT SHAPING INDEPENDENT OF OUTPUT VOLTAGE REGULATION

[75] Inventors: Milivoje S. Brkovic, Plano, Tex.; Slobodan Cuk, Laguna Hills, Calif.

[73] Assignee: California Institute of Technology, Pasadena, Calif.

[21] Appl. No.: 587,031

[22] Filed: Jan. 16, 1996

[51] Int. Cl.[6] .................................. H02M 3/335
[52] U.S. Cl. ...................... 363/17; 363/98; 363/132
[58] Field of Search ............................ 363/17, 22, 23, 363/24, 25, 26, 95, 97, 98, 131, 133

[56] References Cited

U.S. PATENT DOCUMENTS

| | | | |
|---|---|---|---|
| 4,881,014 | 11/1989 | Okochi | 315/246 |
| 5,073,849 | 12/1991 | Morris | 363/21 |
| 5,099,407 | 3/1992 | Thorne | 363/37 |
| 5,157,592 | 10/1992 | Walters | 363/17 |
| 5,231,563 | 7/1993 | Jitaru | 363/98 |
| 5,325,283 | 6/1994 | Farrington et al. | 363/21 |
| 5,418,703 | 5/1995 | Hitchcock et al. | 363/17 |
| 5,442,540 | 8/1995 | Hua et al. | 363/98 |
| 5,539,630 | 7/1996 | Pietkiewicz et al. | 363/17 |

*Primary Examiner*—Peter S. Wong
*Assistant Examiner*—Adolf Berhane
*Attorney, Agent, or Firm*—A. M. Fernandez

[57] ABSTRACT

An ac-to-dc switching full-bridge converter employing voltage bidirectional switches as controllable series input switches, preferably implemented with magnetic amplifiers, that couple ac rectifiers to a single-stage full-bridge dc-to-dc converter in order to provide unity power factor operation by control of input current using a fast current loop to modulate the duty ratio d1 of the voltage bidirectional amplifier switches while independent output voltage regulation is maintained by voltage feedback to the full-bridge converter switches through modulation of the switch duty ratio d of the converter (where d1<d) using an independent fast output regulation loop.

7 Claims, 7 Drawing Sheets

SINGLE-STAGE AC-TO-DC FULL-BRIDGE CONVERTER WITH MAGNETIC AMPLIFIERS FOR INPUT CURRENT SHAPING INDEPENDENT OF OUTPUT VOLTAGE REGULATION

FIELD OF THE INVENTION

The invention relates to an ac-to-dc switching converter, and more particularly to a new technique of employing voltage bidirectional switches as the controllable switches, such as magnetic amplifier switches, to provide both unity power factor and independent output voltage regulation in a single conversion stage.

BACKGROUND OF THE INVENTION

Direct bridge rectification of the ac input line into a capacitive filter results in a poor power factor and high harmonic current pollution. This is no longer acceptable due to tightened international regulations governing the power quality and harmonic current pollution of the utility input line from the ac source. Thus, same form of active power factor control has become necessary.

Recent international regulations governing the power quality and harmonic current pollution of the utility by users has placed increased emphasis on the problem of the interfacing electronic loads to the utility line via power conversion circuits. By using an ac rectifier and a dc-to-dc converter for active input current shaping, it is possible to achieve unity power factor (UPF) operation out of such a dc-to-dc converter while providing regulated voltage to a load. Low frequency energy required for input-output power balance is usually stored externally in an output capacitor connected across the load.

The main drawback of an input current shaper comprising the dc-to-dc converter with external energy storage is low bandwidth of the output voltage regulation limited to a few hertz. This is a consequence of the need to have a large external output capacitance and having a single control in the dc-to-dc converter which cannot simultaneously provide both input current shaping and fast output voltage regulation.

Figure 1:
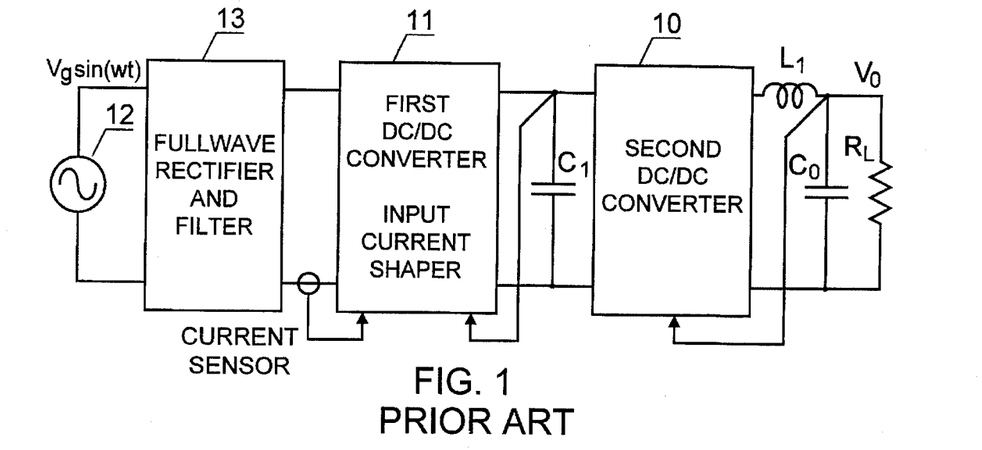
FIG. 1 is a schematic diagram of two cascaded power conversion stages required in the prior art for input current shaping and fast output voltage regulation.

One known solution for achieving UPF operation and at the same time wide bandwidth regulation of the output voltage to a load RL is shown in FIG. 1. The technique is to use a dc-to-dc converter 10, such as a forward, flyback, Cuk, Sepic, half-bridge or full-bridge converter, for output voltage regulation with an additional front-end switching regulator 11 for input current shaping, usually a boost converter coupled to an ac source 12, typically a public utility line, by a fullwave rectifier and lowpass filter 13. Low frequency energy is stored in a capacitor C1 between the two regulators. Galvanic isolation and fast output regulation are then provided by the down-stream dc-to-dc switching converter 10. This solution has several serious drawbacks: (a) power is processed twice, thus leading to lower overall conversion efficiency, (b) the complexity of such a UPF switching converter is increased and (c) both size and cost are increased.

STATEMENT OF THE INVENTION

An object of the present invention is to provide a new and improved light weight, efficient and cost-effective processing of ac electrical power with unity power factor and independent dc output voltage regulation at constant switching frequency in a single conversion stage.

Another object of the invention is to provide an isolated single power stage switching dc-to-dc converter with both unity power factor and fast output voltage regulation.

Yet another object is to eliminate the need for an additional active switching element for input current shaping and slow regulation of voltage on an energy transfer capacitor of the single power stage dc-to-dc converter.

A further object is to provide constant switching frequency operation over a wide load range from no load to rated load, and over a wide range of ac input voltage.

In accordance with the present invention, these and other objects of the invention are achieved in a single-stage, full-bridge switching converter operated at a constant frequency. A fullwave bridge rectifier and lowpass filter supply pulsating voltage to the converter through an input inductor and two voltage bidirectional switches, each preferably realized by a magnetic amplifier (saturable inductor in series with a fast diode) to establish an OFF/ON condition for current to the converter under control of a current signal through a control coil. Each voltage bidirectional switch is connected to a midpoint of a separate one of two rails of the full-bridge switching converter. To complete the full-bridge switching part of the converter, the primary winding of an isolation transformer is connected between the two rails at their midpoints. The two rails are connected in parallel with a storage capacitor to store energy, thus providing a return current path for the current through the full-bridge converter switches. By alternately switching the two voltage bidirectional switches ON while current bidirectional switches of the full-bridge of the converter are switched, current in the input inductor is forced to follow the rectified line voltage at the connection between the rectifier BR1 and the input inductor L1. Alternating pulses of energy are coupled by the primary winding of the isolation transformer to the secondary winding having two diodes, each diode connecting a separate end of the secondary winding to a load through a lowpass filter. The other end of the load is connected to the center tap to provide a return current path for the load on the secondary side. The output dc voltage to the load is sensed for feedback regulation through pulse-width modulation of the duty ratio of the current bidirectional switches. The voltage of the storage capacitor is sensed and compared with a reference voltage to produce an error signal for regulation of the input voltage of the full-bridge converter by modulating the duty ratio of the voltage bidirectional switches operated at the ac line frequency.

To achieve near unity power factor (UPF) operation of the full-bridge switching converter independent of output voltage operation, current through a return current path from the full-bridge converter to the input fullwave rectifier is sensed by suitable means, such as a series resistor, in order to provide a signal proportional to converter current for comparison with the aforesaid full-bridge input voltage error signal derived from the ac power line. The result of that comparison is then used to control the voltage bidirectional switches to turn ON and OFF out of phase with each other and to force current in the input inductor and consequently current at the ac input line to be nearly in phase with the ac line voltage for near UPF operation of the converter. For improved current shaping, the output voltage of the input fullwave rectifier is sensed and used to multiply the aforesaid full-bridge input voltage error signal to produce a new pulsating error signal in synch with the line voltage for comparison with the return current of the full-bridge switching converter.

The novel features that are considered characteristic of this invention are set forth with particularity in the appended claims. The invention will best be understood from the following description when read in connection with the accompanying drawings.

DESCRIPTION OF PREFERRED EMBODIMENTS

Figure 2:
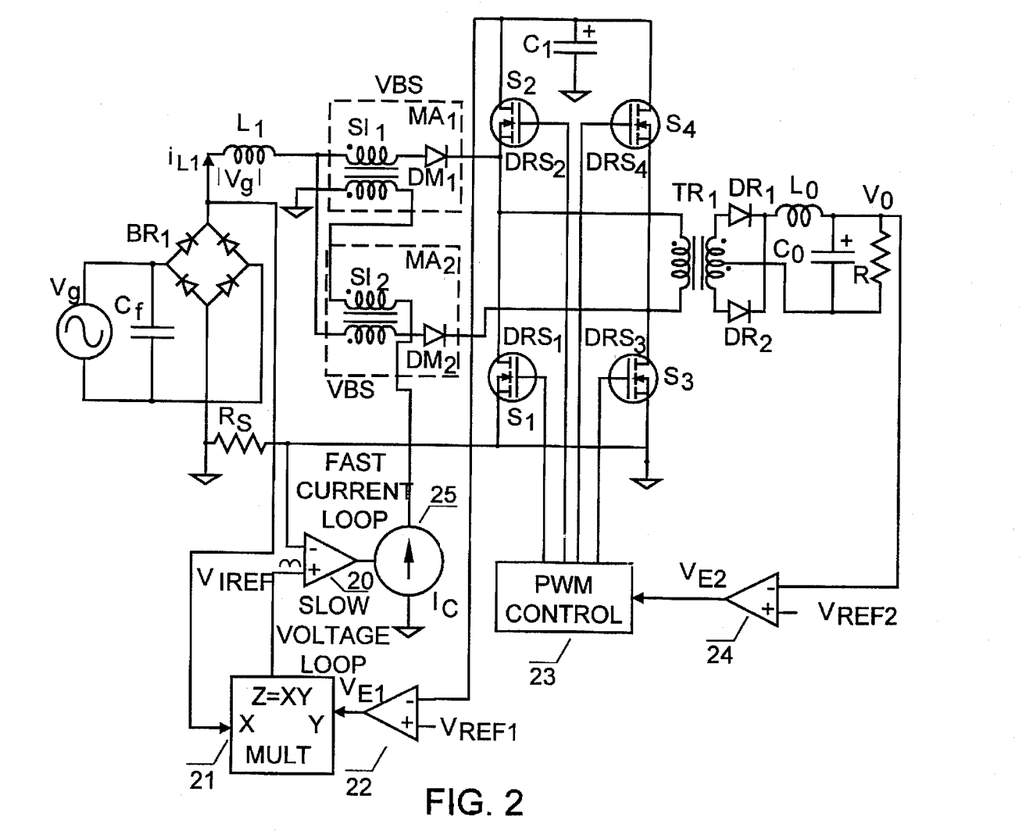
FIG. 2 is a schematic diagram of the present invention using a full-bridge dc-to-dc converter with input inductor and magnetic amplifiers for input current shaping.

Referring to FIG. 2, a single-stage ac-to-dc full-bridge converter using magnetic amplifiers for input current shaping is shown. AC line voltage is rectified using a bridge rectifier BR1. The input inductor L1 is connected between the bridge rectifier and two magnetic amplifiers MA1 and MA2, each comprising a saturable inductor in series with a fast diode connected to a midpoint of one of the two rails of the bridge as may be more easily seen in FIG. 3. A low frequency energy storage capacitor C1 is connected in parallel with the rails, i.e., across the rails of the bridge which are themselves connected in parallel by switches S1–S4. For the proper operation of the converter, the diagonally opposite switches of the bridge (S2 and S3, S1 and S4) shown as ideal switches in parallel with ideal diodes in FIG. 3 must be current bidirectional, which is satisfied by using MOSFET devices as shown in FIG. 2. In this way, the input stage of the present invention full-bridge converter can be easily implemented by a bridge rectifier BR1, input inductor L1, two magnetic amplifiers MA1 and MA2, four current bidirectional switches S1–S4, an energy storage capacitor C1 and a reset current control circuit for the magnetic amplifiers.

A preferred embodiment of the invention shown in FIG. 2 has two independent control circuits, one a reset current control circuit for input current shaping and slow regulation of input voltage across the capacitor C1 comprising a comparator (difference amplifier) 20, multiplier 21 and a comparator (error amplifier) 22, and the other for fast output voltage regulation comprising a comparator (error amplifier) 24 and PWM controller and driver circuit 23 operating at a constant switching frequency F1 from a timing source (not shown) to alternately turn the paired switches ON and OFF out of phase, i.e., to turn on switches S2, S3 ON and switches S1, S4 OFF, and vice versa, during successive cycles of the switching frequency. Voltage $V_{C1}$ across the capacitor C1 is compared with a reference voltage $V_{REF1}$ in the error amplifier 22. The output error voltage $V_{E1}$ is multiplied with rectified line voltage at the output of the bridge rectifier BR1 in order to provide at the output of the multiplier 21 a reference signal $V_{IREF}$ representative of the input current of the single full-bridge converter stage. The amplifier 22 has low bandwidth, usually a few Hertz in order to keep the reference voltage signal for the converter input current proportional to the rectified line voltage. Voltage across resistor $R_S$ which is used to sense input current, i.e., current through the input inductor L1, is compared with the reference voltage $V_{IREF}$ in the difference amplifier 20. Output voltage of that amplifier controls the current $I_c$ generated in a voltage controlled current source 25. The current $I_c$ is supplied to the control coils $N_{c1}$ and $N_{c2}$ of the saturable inductors SI1 and SI2, respectively, in order to provide proper reset of the magnetic amplifiers and control the duty ratio $d_H$ of the magnetic amplifiers to provide input current to the fast diodes DM1 and DM2 proportional to the input line voltage. Output voltage $V_o$ is compared with a reference voltage $V_{REF2}$ in a comparator (error amplifier) 24 which generates voltage $V_{E2}$ fed into a PWM controller unit 23.

Each magnetic amplifier blocks part of the conduction period $dT_s$ of the bottom switch in its corresponding leg of the bridge and controls the duty ratio $d_H$ of the input stage, Thus, since the input stage operates with the duty ratio $d_H$ different from the duty ratio d of the bridge, input current shaping is independent of the fast output voltage regulation. Since the magnetic amplifiers also provide regulation of the input voltage $V_{c1}$ to the full-bridge converter, the output voltage regulation is then required only against the load changes. Fast output voltage regulation is provided either (a) by controlling the duty ratio of the full-bridge converter (i.e., switches S1–S4 in the bridge), in which case feedback isolation (now shown) is required, or (b) by using controllable switches (such as magnetic amplifiers) on the secondary side instead of rectifier diodes DR1 and DR2 which eliminates a need for feedback isolation.

In either case, input current shaping and slow regulation of the converter input voltage $V_{c1}$ are provided by the magnetic amplifiers MA1 and MA2, while fast output voltage regulation is provided in a usual feedback manner by employing conventional PWM control.

Figure 3:
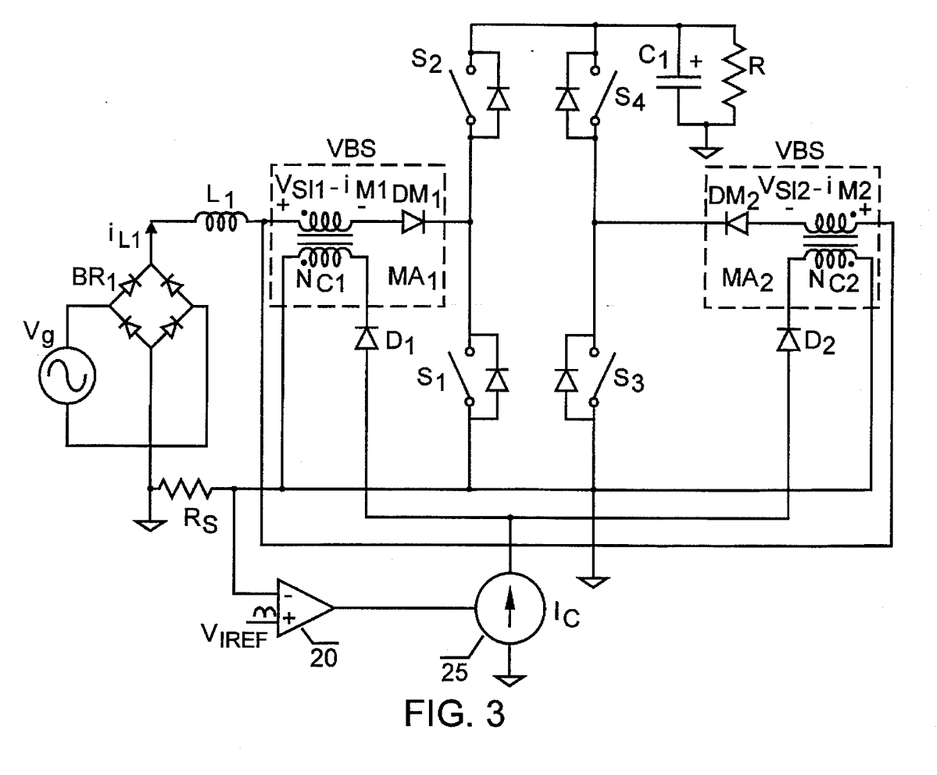
FIG. 3 is a simplified schematic diagram of the circuit illustrated in FIG. 2.

To facilitate understanding the theory of operation, of the full-bridge converter shown in FIG. 2, the converter is shown in FIG. 3 in a simplified schematic diagram. The effective load resistance on the secondary side of the transformer is reflected load to the primary side as resistance R connected across the energy storage capacitor C1. In order to operate the input inductor L1 in continuous conduction mode (CCM), two magnetic amplifier MA1 and MA2 are required. The equivalent circuits, describing four different operating states of the shaper and idealized waveforms of the shaper during a switching period, are shown in FIG. 4 and FIG. 5, respectively.

Figure 5:
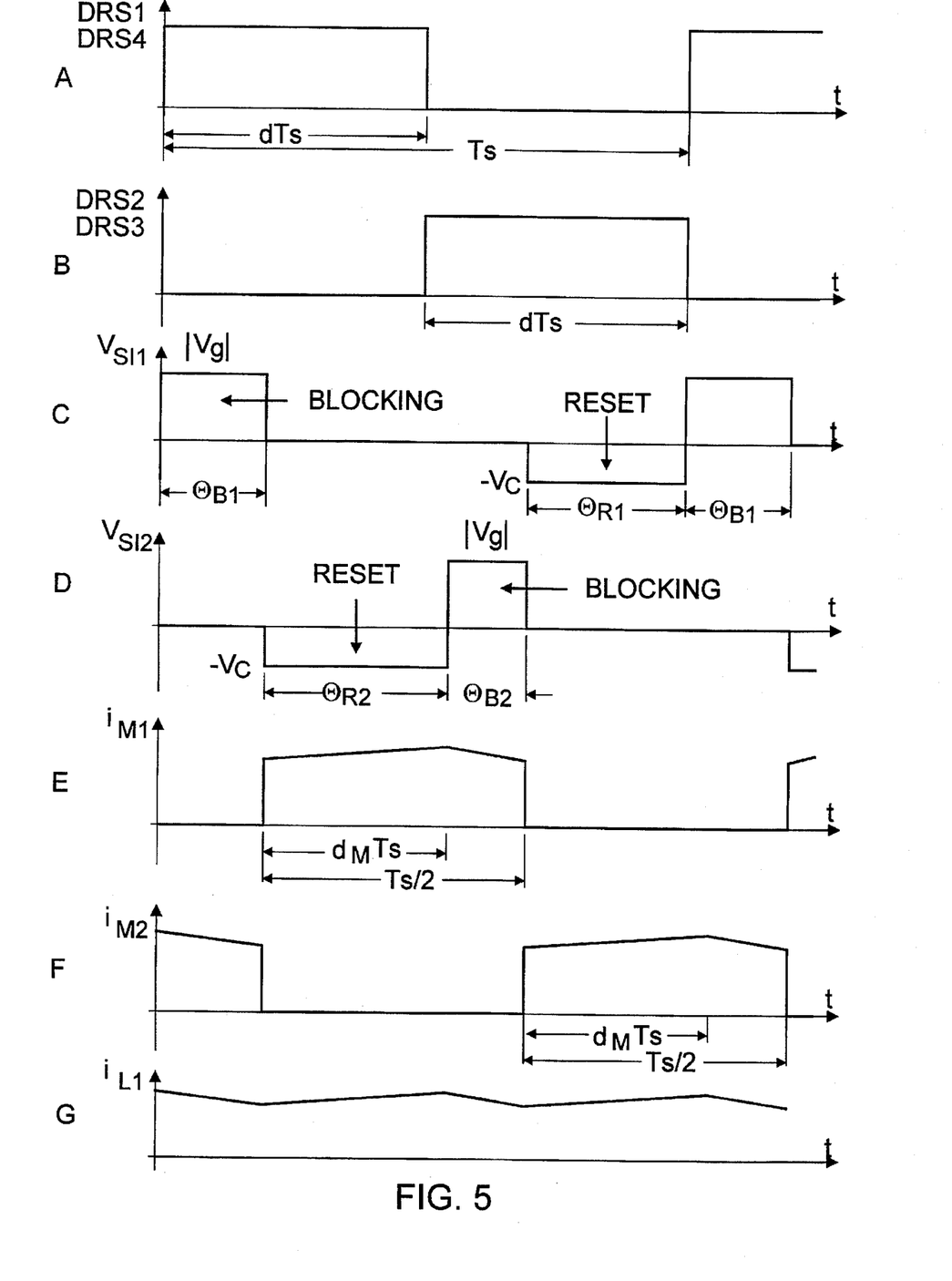
FIG. 5 is a timing diagram of waveforms in the circuit of FIG. 2 in which switches in the full-bridge are all driven at a fixed 50% duty ratio during a switching period.

The switches of two pairs of diagonally opposite switches of the bridge (S1, S4 and S2, S3) are simultaneously driven at constant frequency and exactly 50% duty ratio, while two switches in the same rail (S1, S2 and S3, S4) are driven out of phase as shown in FIG. 5.

Thus, each magnetic amplifier blocks during the portion of the conduction interval of the bottom switch in the corresponding leg (SI for MA1 and S3 for MA2). Energy is stored in the input inductor L1 only during the simultaneous conduction of the bottom switch and its corresponding magnetic amplifier (S1 and MA1, and S3 and MA2) and released into the energy storage capacitor C1 and load R during conduction of the top switches (S2 and S4, respectively). The saturable inductor is reset during the simultaneous conduction of the magnetic amplifier and its corresponding bottom switch in the opposite leg of the bridge as shown in FIG. 5. Therefore, the input current is controlled by controlling the blocking time of the magnetic amplifiers.

Assume that at t=0, the switch S3, previously conducting the input inductor current, is turned OFF and the switches S1 and S4 are simultaneously turned ON. Since the magnetic amplifier MA1 was reset during the conduction of the switch S3, it blocks during the interval $\theta_{B1}$ and forces demagnetization of the input inductor through the switch S4 into the energy storage capacitor C1 (FIG. 4(a)). During the blocking stage of the magnetic amplifier MA1, the magnetic amplifier MA2 is still saturated and the input inductor current, $i_{L1}$, linearly decays. The magnetic amplifier MA1 saturates at $\theta_{B1}$ causing the turn-off of the diode DM2. The blocking state of the magnetic amplifier MA1 is finished and the reset state of the magnetic amplifier MA2 starts (FIG. 4(b)). During the interval $\theta_{B2}$, the input inductor current flows through the saturated magnetic amplifier MA1 and the bottom switch S1, while the magnetic amplifier MA2 is resetting by the control voltage $V_c$. The first half of the switching period is finished by turning off the switches S1 and S4 and turning on the switches S2 and S3, which initiates the blocking state of the magnetic amplifier MA2 and the second half of the switching period (FIG. 4(c)).

Figure 4A:
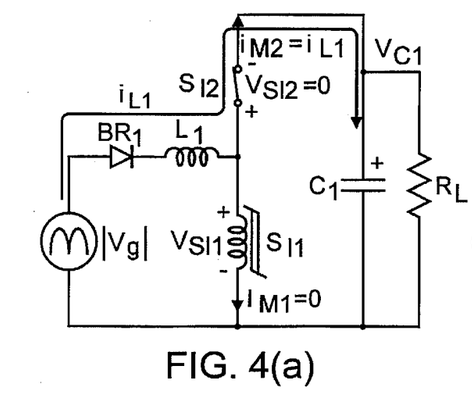
FIG. 4 shows equivalent circuits of the circuit from FIG. 3 during four different operating states: a) blocking state of the magnetic amplifier MA1, b) reset state of the magnetic amplifier MA2, c) blocking state of the magnetic amplifier MA2, and d) reset state of the magnetic amplifier MA1.
Figure 4B:
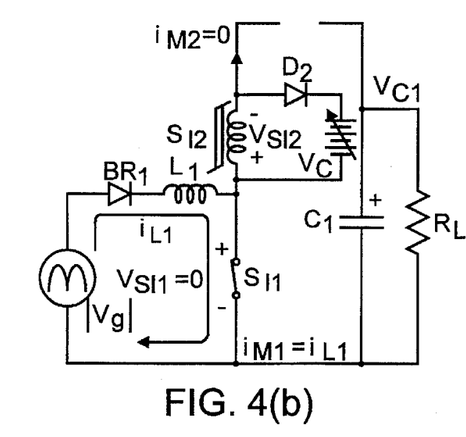
Figure 4C:
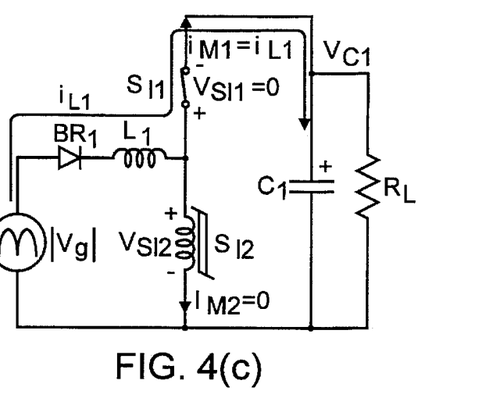
Figure 4D:
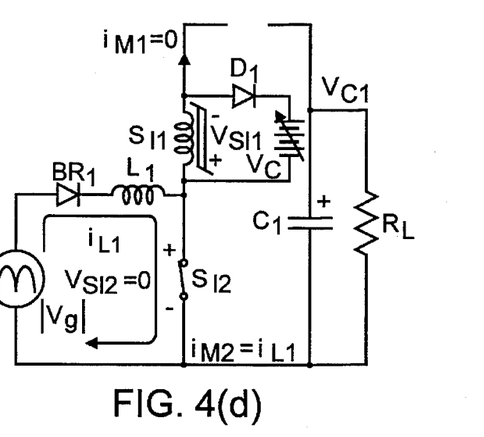

During the interval $\theta_{B2}$, the MA2 blocks and forces demagnetization of the input inductor through the switch S2, into the energy storage capacitor C1 (FIG. 4(c)). During this interval, the magnetic amplifier MA1 is still saturated and the input inductor current, $i_{L1}$, linearly decays.

The magnetic amplifier MA2 saturates after the time $\theta_{B2}$ causing the turn-off of the diode DM1 (FIG. 3), and the magnetic amplifier MA1 runs out of saturation. As a consequence, the input inductor current flows through the saturated magnetic amplifier MA2 and the bottom switch S3 during the reset state of the MA1 (FIG. 4(d)). During the interval $\theta_{R1}$, the magnetic amplifier MA1 is resetting by the control voltage $V_c$.

The second half of the switching period, and therefore a complete switching period, is finished by turning off the switches S2 and S3 and turning on the switches S1 and S4. The operating states of the converter are then repeated during the next switching period cycle.

The conversion ratio $M_1$ of the shaper is calculated from the volt-second balance on the input inductor L1 as:

$$M_1 \equiv \frac{V_{C1}}{V_g} = \frac{1}{2-d_m}, \quad (1)$$

where, $d_H$ is the magnetic amplifiers duty ratio. Notice that due to the symmetry $$\theta_{B1} = \theta_{B2} = (d - d_m)T_s \quad (2.a)$$

$$\theta_{R1} = \theta_{R2} = d_m T_s \quad (2.b)$$

where, d is the duty ratio of the bottom switches of the bridge. For the symmetrical drives shown in (FIG. 5), that duty ratio d=0.5. We are now interested in the minimum conversion ratio $M_{1min}$ which occurs at the maximum input voltage $V_{gmax}$. The ratio $M_{1min}$ is determined by the minimum achievable duty ratio of the magnetic amplifiers $d_{Hmin}$. The minimum duty ratio $d_{Hmin}$ is determined by the by the maximum reset voltage $V_{cmax}$ which is limited to $V_{c1}$ as shown in FIGS. 4(b) and 3(d). From the equality of the volt-seconds stored and the volt-seconds blocked, we get.

$$V_c d_M T_s = V_{c1}(d - d_H)T_s \quad (3)$$

The duty ratio $d_H$ of the magnetic amplifier is then calculated from Equation (3).

$$d_m = d\frac{V_{C1}}{V_{C1} + V_C} = \frac{1}{1+\alpha}d, \quad (4)$$

where, $$\alpha \equiv \frac{V_C}{V_{C1}}. \quad (5)$$

In the case of d=0.5, the minimum duty ratio $d_{Hmin}=0.25$ is achieved for $V_c=V_{cstr}$ ($\alpha=1$), which results in the minimum conversion ratio $M_{1min}=2$. The main disadvantage of the symmetrical 50% drives is the voltage stress on the active switches S1–S4 which is twice the input voltage (2 $V_{gmax}$). Thus, the applications of the full-bridge shaper with magnetic amplifiers and 50% duty ratio are limited to the lower line voltages.

The Asymmetrical Drives

Figure 6:
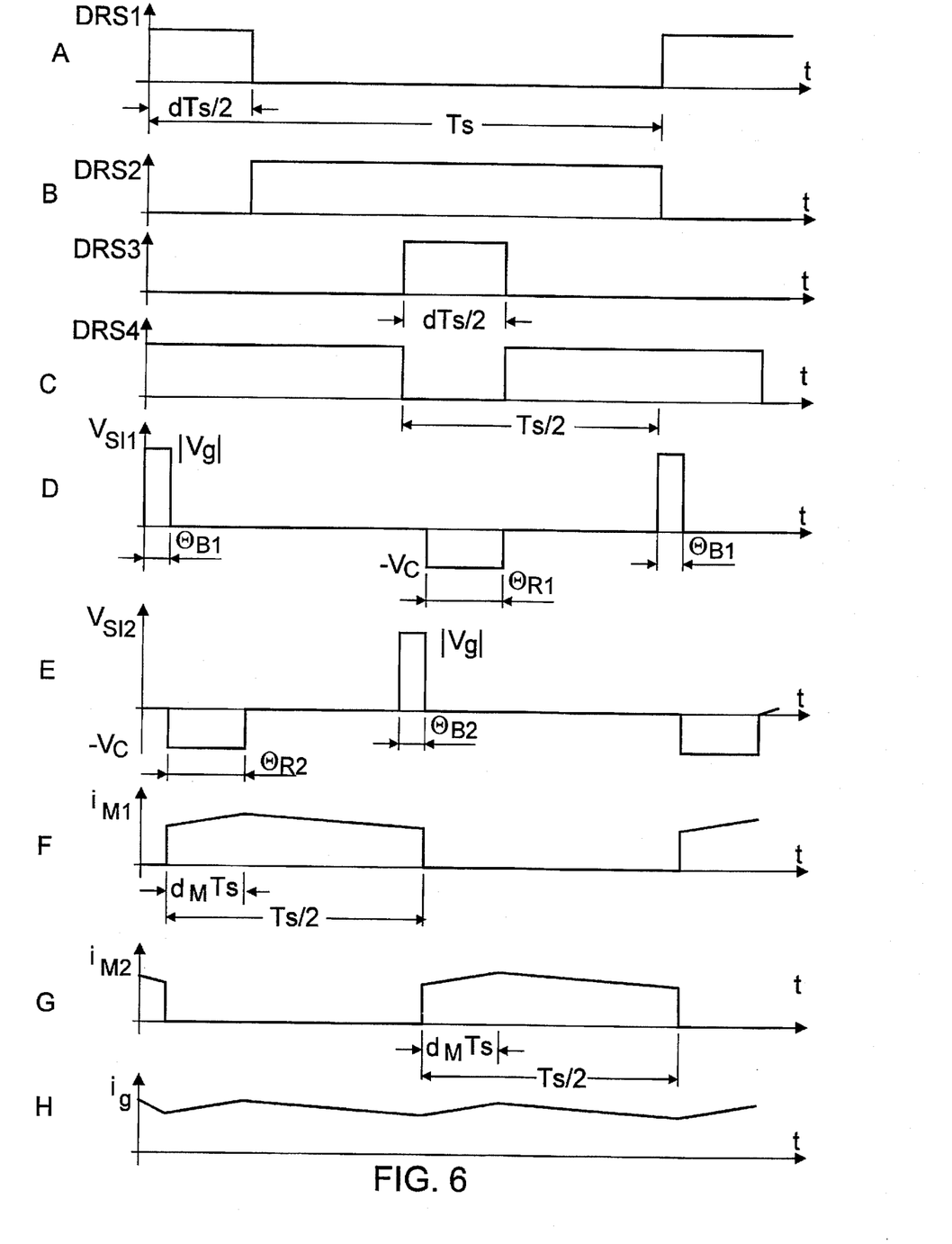
FIG. 6 is a timing diagram of waveforms in the circuit of FIG. 2 in which switches in the full-bridge are driven at asymmetrical duty ratios during a switching period.

The minimum conversion ratio $M_{1min}$ can be reduced below two if asymmetrical drives are used. Idealized waveforms of the full-bridge shaper from FIG. 3 with the asymmetrical drives are shown during a switching period in FIG. 6. The principle of operation is the same as with symmetrical drives. During the intervals when the bottom switches (SI and S3) are both turned off and the top switches (S2 and S4) are turned on, one magnetic amplifier is saturated and carries the input inductor current while the voltage on the other magnetic amplifier is limited to zero. Therefore, as before, each magnetic amplifier (for instance, MA1) is reset only during the simultaneous conduction of the other magnetic amplifier and its corresponding bottom switch S3.

The minimum duty ratio of the magnetic amplifier $d^m_{Mmin}$ and the minimum conversion ratio $M^a_{1min}$ are calculated from Equation (4).

$$d^a_{Mmin} = 0.5d, \quad (6.a)$$

$$M^a_{1min} = \frac{1}{1-d}, \quad (6.b)$$

where, the superscript a is used for the asymmetric drives,

It is evident from the above analysis that the proposed full-bridge shaper shown in FIG. 2 has the same conversion ratio and input current waveform as the boost shaper operated in CCM.

Control of Magnetic Amplifiers

The input current shaping in the proposed topology is provided by average current mode control. Even though the control circuit from FIG. 2 looks the same as in the conventional shaper, there is a major difference in the switch controller. Namely, in the conventional shaper operated in CCM and with an average current mode control, as explained in L, H. Dixon, Jr., "High power factor preregulators for off-line power supplies," *Unitrode Power Supply Design Seminar SEM-800*, 1991, pp.12.1–16, the output of the comparator (difference amplifier 20 in the present invention) amplifier is compared with a sawtooth waveform in a pulse-width modulator which modulates the duty ratio of the transistor. In contrast to that, in the present invention the output of the difference amplifier 20 controls the reset current of the magnetic amplifiers in the voltage controlled current source 25 which modulates the duty ratio of the magnetic amplifiers. Both reset methods of the magnetic amplifiers, the voltage and current, are possible. In addition, instead of having a driver with a high pulse current capability for driving the transistor (high voltage MOSFET) in the conventional boost shaper, the magnetic amplifiers are driven with a low current source, Therefore, the magnetic amplifiers in the shaper of FIG. 2 combine the functions of both a PWM modulator and a power switch into a single power component, Experimental Results Experimental waveforms obtained in the 150 W, 50 V prototype of the full-bridge shaper from FIG. 3 are shown in this section, The converter was operated at 150 KHz and fixed 50% duty ratios from the line voltage 110 VAC. The component values used in the prototype are listed below: BRI=VH248; DM1, DM2=1OCTF40; Q1–Q4=IRF640; I L1=300 µH; $C_f$=1 µF; C1=470 µF- SI1, SI2–30 T 8X#30AWG wire on core 50B45-IE (Magnetics).

Figure 7:
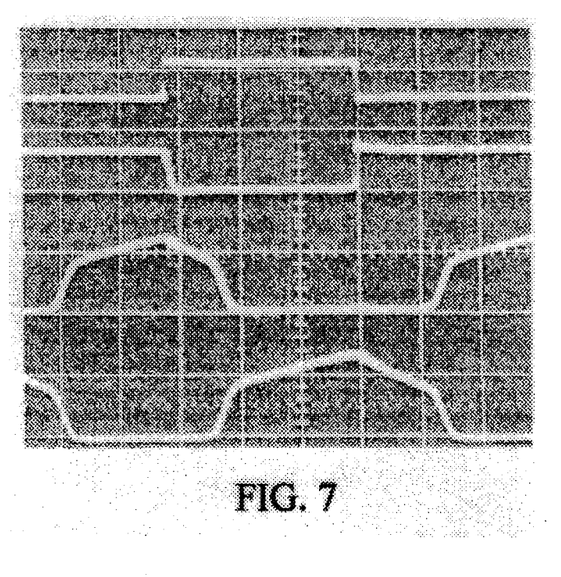
FIG. 7 is a timing diagram of waveforms in the experimental circuit during the switching period at the peak of the line voltage: (a) drive signals DRS1 and DRS4 (top trace: 20 V/div.), (b) drive signals DRS2 and DRS3 (trace #2: 20 V/div.), (c) current in magnetic amplifier MA2 (trace #3: 2A/div.) and (d) current in magnetic amplifier MA1 (trace #4: 2A/div.) with the time scale: 1 µs/div.

Drive waveforms for the MOSFETs and currents in two magnetic amplifiers are shown during the switching period at the peak of the line voltage in FIG. 7 to verify predicted behavior from FIG. 5. The small asymmetry in the current waveforms of the two magnetic amplifiers is consequence of the mismatched diodes DMI and DM2, and cores used for magnetic amplifiers. This asymmetry is inherent to all symmetrical topologies, particularly when the current reset method is used for the magnetic amplifiers.

Figure 8A:
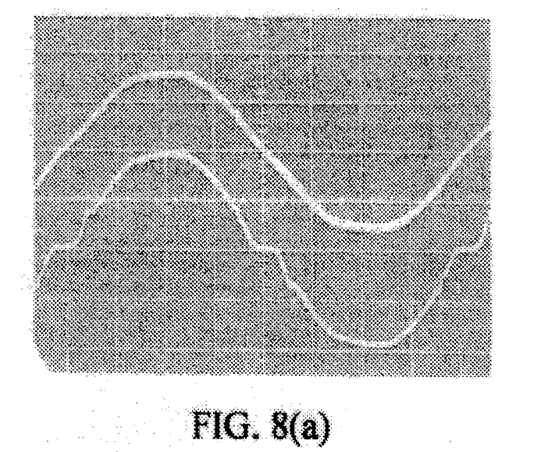
FIG. 8 shows measured the line voltage (top trace: 100 V/div.) and the line current (bottom trace: 1A/div.) waveforms at: (a) full output power of 150 W, (b) 50% load, and (c) 25% load, during the line period (time scale: 2 ms/div.).
Figure 8B:
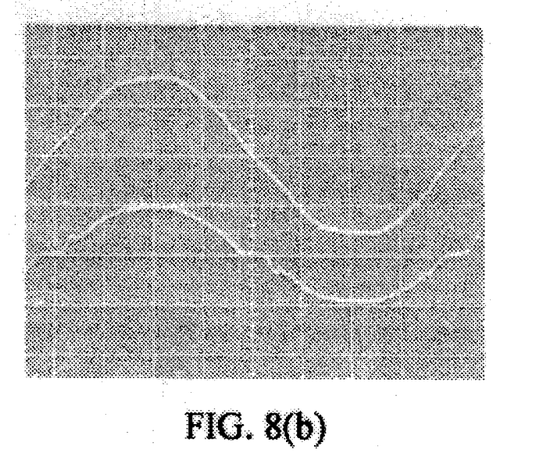
Figure 8C:
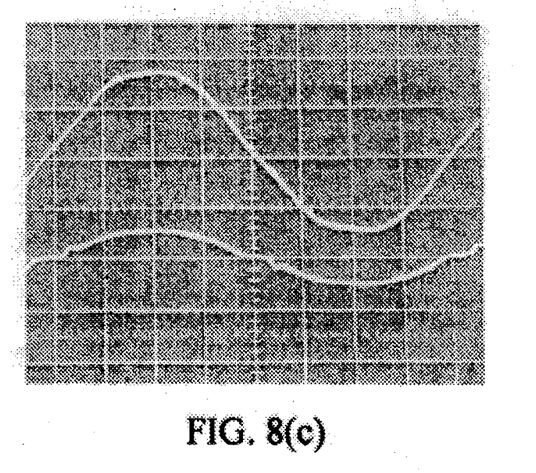

The line voltage and the line current waveform during the line period are shown for three different load currents 3A (100% load), 1.5A (50% load), and 0.75A (25% load) in FIGS. 8(a)–8(c), respectively. As one can see, the line current follows line voltage for a wide range of load current. The crossover distortion in the line current is a consequence of the reverse recovery current of the diodes DMI and DM2, which introduces undesirable reset of the magnetic amplifiers at the zero crossing of the line voltage. This is not a serious problem and can be very easily solved with some additional circuit.

Although particular embodiments of the invention have been described and illustrated herein, it is recognized that modifications may readily occur to those skilled in the art. Consequently, it is intended that the claims be interpreted to cover such modifications and equivalents thereof.

What is claimed is:

1. A single-stage ac-to-dc full-bridge switching converter operated at a constant frequency for transferring dc power from an ac power line comprising a fullwave bridge rectifier and lowpass filter coupling power in the form of unipolar pulsating voltage from said ac power line to said full-bridge switching converter through an input inductor and two voltage bidirectional switches, each voltage bidirectional switch being connected in series to a midpoint of a separate one of two rails of said full-bridge switching converter, said two rails being connected in parallel with a storage capacitor to store energy transferred there by four current bidirectional switches, one in each of two legs in each of said two rails as said current bidirectional switches of said full-bridge switching converter are alternately turned ON and OFF, one set of diagonally opposite current bidirectional switches being switched on and the other set of diagonally opposite current bidirectional switches being switched OFF at said constant frequency, a transformer having its primary winding connected between said midpoints of said two rails for coupling energy pulses of alternating polarity to circuit means connected to the secondary winding of said transformer for coupling lowpass filtered unipolar energy in the form of output dc voltage to said load, a first closed loop having a first means for sensing said output dc voltage to said load and means responsive to said first sensing means for regulating said output dc voltage to said load, a second closed loop having a second means for sensing the voltage level of energy stored in said storage capacitor and means responsive to said second sensing means for regulating the voltage of energy stored in said storage capacitor by control of the duty ratio of said voltage bidirectional switches operated alternately at said constant frequency on said power line, and a third closed loop having a third means for sensing current passed by said voltage bidirectional switches operated alternately and a fourth means for sensing voltage at the output of said fullwave rectifier, and further having means responsive to said third and fourth sensing means for shaping current pulses to said full-bridge switching converter to be nearly in phase with said ac power frequency for near unity power factor operation of said ac-to-dc full-bridge switching converter.

2. A single-stage ac-to-dc full-bridge switching converter as defined in claim 1 wherein said two voltage bidirectional switches pass current from said fullwave bridge rectifier and lowpass filter to said midpoints of said two rails and are implemented as voltage bidirectional magnetic amplifier switches with control coils connected for out-of-phase operation during each switching interval $T_s$, means for alternately turning said one and said other of said sets of diagonally opposite current bidirectional switches ON and OFF, first one set of diagonally opposite current bidirectional switches turned ON while said other set of diagonally opposite current bidirectional switches is OFF and then said other set such that a first current bidirectional switch on the bottom of each of said sets is turned ON while a second current bidirectional switch on the top of each of said sets is turned OFF during a fraction of a switching cycle $T_s$ as said sets are alternately turned ON and OFF, and wherein each bidirectional voltage magnetic amplifier switch providing current to a different one of said two rails having sets of current bidirectional switches is reset through said control coil thereof during the simultaneous conduction of the other voltage bidirectional magnetic amplifier switch and its controlled current bidirectional switch on the bottom.

3. A single-stage ac-to-dc full-bridge switching converter as defined in claim 2 including means for operation at a minimum conversion ratio $M_{1min}=1/(1-d)$ determined by the minimum achievable duty ratio $d_{min}$ of said magnetic amplifiers determined by a maximum reset voltage $V_{cmax}$ which is limited to voltage across said storage capacitor and means for asymmetrical drive to said sets of current bidirectional switches of said full-bridge switching converter to alternately turn ON and OFF said sets of diagonally opposite current bidirectional switches, first one set of current bidirectional switches while the other is OFF and then the other set of current bidirectional switches such that a first current bidirectional switch on the bottom of a rail is turned ON while the second current bidirectional switch on the top of the rail is turned OFF during a fraction of said switching cycle $T_s$ and vice versa for the other rail while each bidirectional voltage magnetic amplifier switch that passes current to a different one of said two sets of current bidirectional switches is reset during simultaneous conduction of the other bidirectional voltage magnetic amplifier, and the minimum duty ratio $d_{Hmin}$ of the voltage bidirectional magnetic amplifier switch is set equal to one half d.

4. A single-stage ac-to-dc full-bridge switching converter as defined in claim 1 wherein each of said voltage bidirectional switches comprises a saturable reactor and a diode connected in series.

5. A single-stage ac-to-dc full-bridge switching converter as defined in claim 4 wherein said means for shaping said current pulses to said full-bridge switching converter comprises a means for providing a feedback signal as a function of current sensed by said third means and voltage sensed by said fourth means for control of a current source coupled to said saturable reactor for control of reset current for said saturable reactor.

6. A single-stage ac-to-dc full-bridge switching converter as defined in claim 5 wherein said controlled current source is inductively coupled to said saturable reactor by a control coil.

7. A single-stage ac-to-dc full-bridge switching converter as defined in claim 6 wherein said diode is a fast switching diode.

* * * * *